A. M. KENNEDY.
FENDER FOR AUTOMOBILES AND OTHER VEHICLES.
APPLICATION FILED FEB. 25, 1913.
1,148,234.
Patented July 27, 1915.
2 SHEETS—SHEET 1.
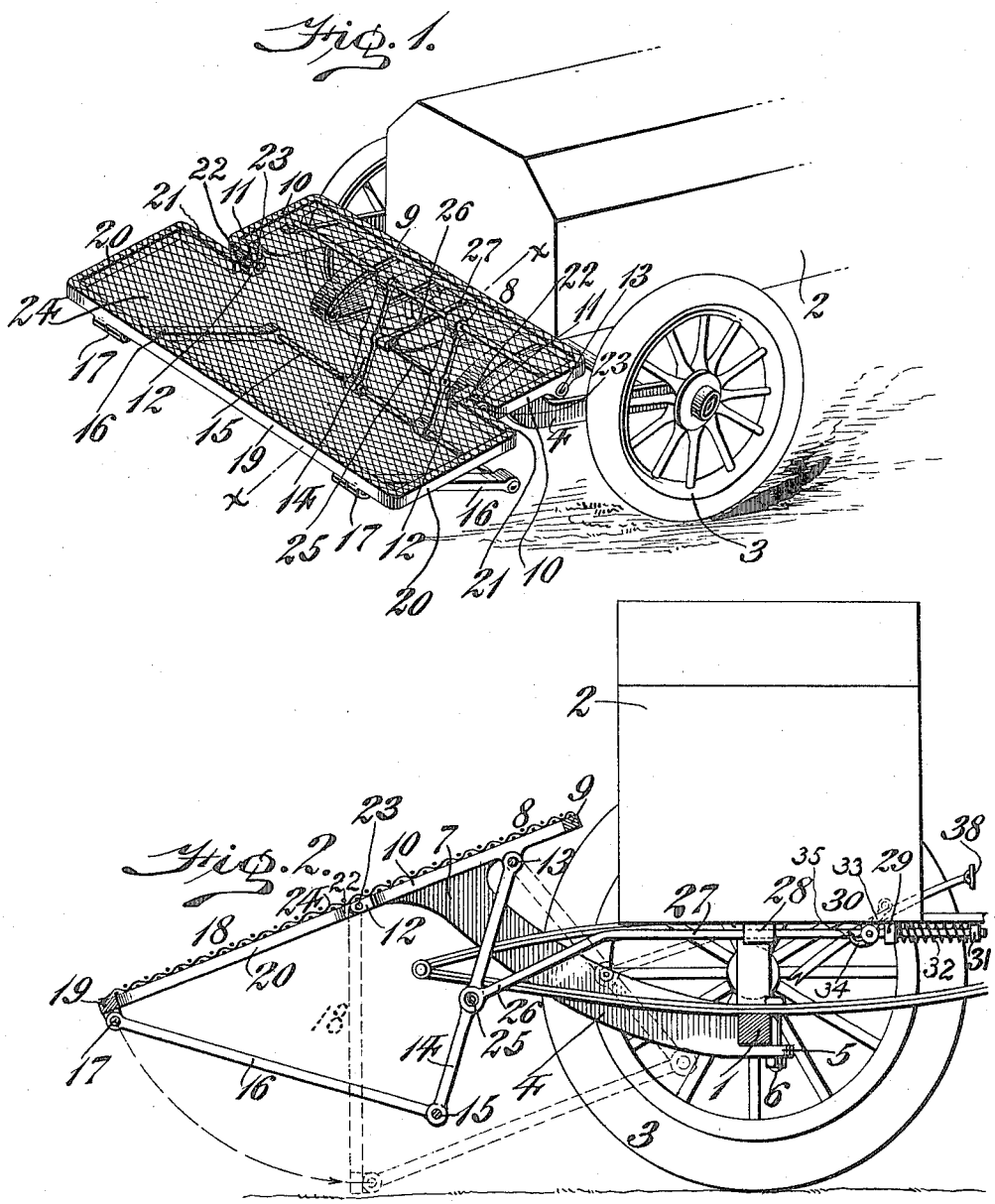

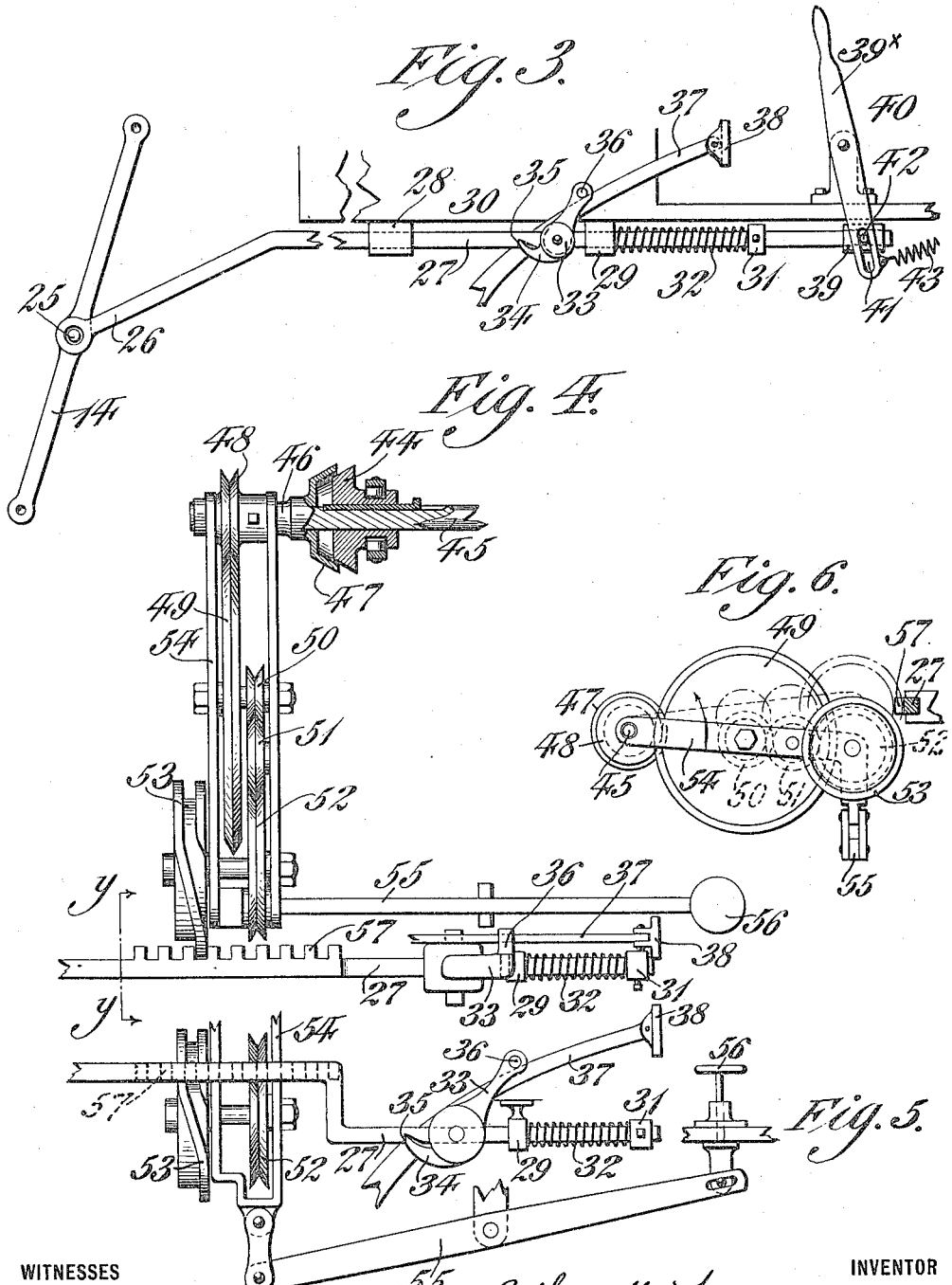

UNITED STATES PATENT OFFICE.

ARTHUR M. KENNEDY, OF PHILADELPHIA, PENNSYLVANIA.

FENDER FOR AUTOMOBILES AND OTHER VEHICLES.

1,148,234. Specification of Letters Patent. Patented July 27, 1915.

Application filed February 25, 1913. Serial No. 750,490.

*To all whom it may concern:*

Be it known that I, ARTHUR M. KENNEDY, a citizen of the United States, residing in the city and county of Philadelphia, State of Pennsylvania, have invented a new and useful Fender for Automobiles and other Vehicles, of which the following is a specification.

My invention relates to a novel construction of an automobile fender, comprising an upper, stationary member, and a lower, movable member, which latter is adapted to preferably remain normally elevated or substantially in line with said upper, stationary member, provision being made for releasing said lower, movable member when the brake pedal of the automobile is actuated to the desired extent, by the chauffeur or driver thereof, thereby causing the lower member to drop into operative position in case the automobile or similar vehicle is likely to hit a pedestrian or other object.

By my present invention, I provide novel means for normally maintaining the lower, movable member of the fender in elevated position by a suitable tripping mechanism having connections to the brake pedal of usual construction, provision being made so that the normal or ordinary application of the brake for the purpose of stopping the vehicle under ordinary conditions will not release the fender, but in case of an emergency stop, as when a pedestrian is about to be hit, the additional pressure upon the brake pedal to effect said emergency stop will cause the movable member of the fender to drop into operative position, and protect the person hit from serious injury.

My invention also consists of a novel construction of tripping mechanism and connections therefrom to the brake pedal, whereby said tripping mechanism will be thrown into operation and the lower portion of the fender caused to descend, in case of an emergency stop, provision being also made for restoring the lower portion of the fender to its elevated, normal position without necessitating the chauffeur or operator of the automobile or other vehicle getting out of the same.

To the above ends, my invention consists of a novel construction of fender, particularly adapted for automobiles and other vehicles, which can be readily applied to the front axle or similar part thereof without necessitating any changes, dismantling or mutilation, of the automobile body or running gear, the novel features of which will be hereinafter fully set forth and particularly pointed out in the claims.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a perspective view of the front of an automobile or similar vehicle having thereon a novel fender embodying my invention. Fig. 2 represents a section on the line $x$—$x$ of Fig. 1, certain of the parts being shown in elevation. Fig. 3 represents a side elevation of the tripping mechanism and its connections to the brake pedal, whereby the fender will be operated, upon the making of an emergency stop and showing also the elevating means employed for raising the fender. Fig. 4 represents a plan view, partly in section, of a modified construction of elevating device. Fig. 5 represents a side elevation of Fig. 4. Fig. 6 represents a section on the line $y$—$y$ Fig. 4.

Similar numerals of reference indicate corresponding parts in the figures.

Referring to the drawings:—1 designates the front axle of an automobile or other vehicle 2, said axle carrying the front wheels 3 which are mounted thereon in the usual manner and provided with the usual steering appliances, (not shown).

4 designates a beam which is preferably forked at its rear portion, as indicated at 5, and provided with suitable fastening devices 6, whereby said beam is readily secured to said front axle 1 without any change or alteration thereof, there being two of said beams, as will be understood from Fig. 1, and the forward extremity of said beams being inclined, as indicated at 7, and adapted to support the upper stationary fender frame 8 which is composed of the rear wall 9, the side walls 10, which have inwardly deflected portions 11, terminating in the terminals 12.

13 designates a rod passing through the side members 10 and having pivotally attached thereto and depending therefrom, the links 14 which pass through the lower terminals of the rod 15 whose upper ends are journaled in the rear portions of the arms 16, whose forward extremities are pivoted at 17 to the front portion of the movable fender frame 18, which is provided with the front wall 19, the side walls 20 and the rear wall 21, which has the inwardly deflected terminals 22, which are pivoted to the terminals 12 by means of the pins 23, the two fender frames being bridged by the netting 24, as will be understood from Figs. 1 and 2.

25 designates a rod joining the intermediate portion of the links 14, said rod having pivotally attached thereto the forward end 26 of an operating bar, 27, which is slidingly mounted on ears or bearings 28 and 29, which are attached to the bottom of the automobile body 30, as will be understood from Figs. 2 and 3.

31 designates a collar fast on the bar 27, against which abuts one end of a spring, 32, the other end of which said spring contacts with a fixed or stationary bearing 29, as will be understood from Figs. 2 and 3, so that the tendency of said spring or tension device will be at all times to draw the collar 31, the bar 27, as well as the rod 25 and the links 14, to which said rod is secured, rearward.

33 designates a catch or pawl pivotally mounted on a suitable support, such as a lug, on the body 2, (see Fig. 2) and having a nose 34 adapted to engage a notch, 35, in the sliding bar 27, said pawl having a pin, 36, at one arm, which is adapted to be engaged by the upper edge of the lever 37 of the brake pedal 38, said brake pedal lever 37 being connected to the braking mechanism in the usual or any suitable manner.

When the brake pedal 38 is pushed for an ordinary stop movement, the parts are so adjusted and correlated, that for an ordinary stop, the forward movement of the brake pedal 38 and the lever 37 will not actuate the pin 36 and its adjuncts; but, in case of an emergency stop, the brake pedal 38 and its lever are advanced so as to cause said lever to contact with the pin 36, releasing the nose 34 of the pawl 33 from the notch 35, whereupon the spring 32, pressing against the collar 31, will move the bar 27, the rod 25, and the arms 14 from the position seen in full lines in Fig. 2, to the position seen in dotted lines in said figure, whereupon the forward movable fender-member 18 will move from that seen in full lines to the position seen in dotted lines, Fig. 2, the same dropping by gravity.

When the lever 39× is actuated in the desired direction, the movable fender-member 18 will move from the position seen dotted in Fig. 2, to the position seen in full lines in said figure, and the nose 34 of the pawl 33 will engage the notch 35 of the sliding bar, thereby retaining the fender in the position seen in full lines, Figs. 1 and 2.

The sliding fender-actuating bar 27 has a collar, 39, slidably supported upon its inner end, and the forked arm of a lever, 39×, fulcrumed at 40 upon the chassis of the vehicle, straddles such collar and has its slotted limbs, 41, engaging pins, 42, upon the same. A spring, 43, serves to draw the lower arm of the lever normally rearward. When the fender-actuating bar is moved rearward by its spring upon dropping of the fender, the rear collar 31 upon the bar moves toward the slide-collar 39, and by pulling rearward upon the lever-handle, said latter collar engages the fixed collar upon the actuating bar, moving the same forward and resetting the fender, which will again be held in position by the pawl engaging the notch in the bar, whereupon the spring connected to the hand-lever will again pull the latter and the sliding collar back to its normal position.

In Figs. 4, 5 and 6, is illustrated a device whereby the fender may be raised by power from the engine of the vehicle. A friction clutch has its driving member, 44, sliding upon and revolving with the engine-shaft, 45, or other rotating shaft of the engine mechanism, and the shaft, 46, of the driven member, 47, of the clutch carries a friction-gear, 48, or toothed gear, which through reducing gears, 49, 50, 51 and 52, conveys rotary movement to a worm, 53. Said gears and worm are journaled in a swinging frame, 54, fulcrumed upon or in axial alinement with the driving shaft, and a foot-lever, 55, having a treadle, 56, is connected to the free end of said frame to raise and lower the same and the worm journaled therein into and out of engagement with a rack, 57, upon the sliding fender-actuating bar. By actuating the foot-lever, the worm can be placed in engagement with the rack upon the actuating bar to slide the same forward to reset the fender.

It will be apparent that in my fender construction, the parts normally lie in a position where they will not interfere with the ordinary travel of the vehicle, and they are supported without the provision of complicated parts, and the operating means employs but a few parts and is so located as to be inconspicuous, the movable fender-member being released merely by the operation of the ordinary foot pedal, when an emergency stop is desired in case of an impending accident.

My novel fender construction does not interfere with the lights or with the necessary influx of air to the radiator, and is out of the way when not needed, giving full under clearance required.

The fender operating mechanism is controlled absolutely by the driver without any additional effort on his part, but solely by obedience to the natural impulse to apply the brake under emergency conditions, at the time of impending accident, and there will be no interference with the operation of the regular brake mechanism, should the fender be injured.

My novel fender is easily adjusted or adaptable to any make or style of automobile, as it can be readily attached to the front axle thereof, and is not complicated or likely to get out of repair, and is not unsightly or cumbersome. It is readily removed, and does not hamper the replacing or inspection of the front tires, and is comparatively inexpensive to install.

It will of course be evident that the foot operating mechanism may be other mechanism than the regular brake operating mechanism, but I prefer to employ the regular brake operating mechanism, since it is desirable to reduce the mechanism under the control of the foot of the chauffeur to as few parts as possible.

It will be apparent from the foregoing that my novel device is not only a safeguard and the like to pedestrians and others on the highways, but in use, it will furnish a positive proof, if necessary, of the application of the brake, and if the speed has not been excessive and the usual warning been given, it will indicate by its operation, that everything possible to avoid a fatal accident had been done by the chauffeur or driver of the automobile.

It will now be apparent that I have devised a novel and useful construction of a fender for automobiles and other vehicles, which embodies the features of advantage enumerated as desirable in the statement of the invention and in the above description, and while I have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. A fender for vehicles, comprising a stationary frame secured with its transverse bar to the front of the vehicle and having forwardly projecting side bars, a movable frame having its side bars hinged at their rear ends to the forward ends of the stationary frame bars, coverings for such frames, means for admitting the outer end of the said movable frame to automatically swing downwardly and rearwardly on its hinge, and means for positively releasing said movable frame from its normal raised position.

2. A fender for vehicles, comprising a stationary frame secured with its transverse bar to the front of the vehicle and having forwardly projecting side bars, a movable frame having its side bars hinged at their rear ends to the forward ends of the stationary frame bars, a flexible cover secured to both frames, means for admitting the outer end of the said movable frame to automatically swing downwardly and rearwardly on its hinge, and means for positively releasing said movable frame from its normal raised position.

3. A fender for vehicles, comprising a stationary frame secured to the front of the vehicle frame to project forward, a movable frame hinged to the front of said stationary frame to swing downward, coverings for such frames, automatic means connected to said movable frame to tilt the same downward, means for retaining such tilting means, and a pedal connected to said retaining means to release the same, when operatively actuated.

4. A fender for vehicles, comprising a stationary frame secured at the front of the vehicle, a movable frame hinged to the front of such stationary frame and adapted to swing downward, a slidable bar movably connected to said movable frame and having automatic means for drawing it rearward, a pedal, and a pawl engaging said slidable bar and adapted to be disengaged from the latter by actuating such pedal for an emergency stop.

5. A fender for vehicles, comprising a stationary frame secured at the front of the vehicle, a movable frame hinged to the front of such stationary frame and adapted to swing downward, a slidable bar movably connected to said movable frame, a spring connected to said bar to draw the same rearward, a pedal, and a pawl engaging said bar and having a pin upon one arm and arranged to be engaged and rocked by said pedal when the latter is actuated for an emergency stop.

6. A fender for vehicles, comprising a stationary frame secured at the front of the vehicle, a movable frame hinged to the front of such stationary frame and adapted to swing downward, a slidable fender-actuating bar movably connected to said movable frame and having automatic means for drawing it rearward, a pedal, a catch adapted to engage and hold said bar against said automatic means and constructed to be released by said pedal being operated for an emergency stop, and means supported in the body of the vehicle for drawing the fender-actuating bar forward.

7. A fender for vehicles, comprising a stationary frame secured at the front of the vehicle, a movable frame hinged to the front of such stationary frame and adapted to swing downward, a slidable actuating bar movably connected to said movable frame and guided in bearings upon the vehicle frame and having a collar secured upon it, a spring bearing against said collar and one of the bearings, a pedal, a pawl engaging said bar and adapted to be disengaged from the same by the pedal being actuated for an emergency stop, a collar slidable upon the rear end of the actuating bar, a lever movably connected to said collar, and a spring connected to return said lever to normal position.

8. A fender for vehicles comprising a stationary frame secured to the front of the vehicle frame so as to project forwardly, a movable frame hinged to the front of said stationary frame to swing downwardly therefrom, a backwardly and forwardly swinging lever located beneath the stationary frame, a connection between the lower end of said lever and the forward end of the swinging frame, a slidable bar connected to said swinging lever, means for retracting said bar, and releasable means for retaining it in the projected position.

ARTHUR M. KENNEDY.

Witnesses:
E. HAYWARD FAIRBANKS,
FREDERICK G. SCHENKEL.

Copies of this patent may be obtained for five cents each, by addressing the "Commissioner of Patents, Washington, D. C."